United States Patent
Nezaki et al.

(10) Patent No.: US 7,604,253 B2
(45) Date of Patent: Oct. 20, 2009

(54) AIR BELT APPARATUS

(75) Inventors: Takuya Nezaki, Aichi (JP); Yoji Suyama, Tokyo (JP)

(73) Assignee: Takata Corporation, Tokyo (JP)

( * ) Notice: Subject to any disclaimer, the term of this patent is extended or adjusted under 35 U.S.C. 154(b) by 421 days.

(21) Appl. No.: 11/591,474

(22) Filed: Nov. 2, 2006

(65) Prior Publication Data
US 2007/0102909 A1    May 10, 2007

(30) Foreign Application Priority Data
Nov. 4, 2005  (JP) ............................. 2005-321426

(51) Int. Cl.
*B60R 21/18* (2006.01)
(52) U.S. Cl. ..................................... 280/733
(58) Field of Classification Search ............... 280/733
See application file for complete search history.

(56) References Cited

U.S. PATENT DOCUMENTS

| 5,390,953 | A | 2/1995 | Tanaka et al. |
| 6,082,763 | A | 7/2000 | Kokeguchi |
| 6,375,218 | B2 | 4/2002 | Iseki |
| 6,439,601 | B1 | 8/2002 | Iseki |
| 6,648,369 | B2 | 11/2003 | Mishima et al. |

FOREIGN PATENT DOCUMENTS

JP  2000-203380 A  7/2000

*Primary Examiner*—Eric Culbreth
(74) *Attorney, Agent, or Firm*—Foley & Lardner LLP

(57) ABSTRACT

An air belt apparatus for use in a vehicle is provided to improve the comfort of the webbing during normal operation by thinning the webbing that passes through a shoulder anchor, while extending a developing length of an expanding portion upward when the expanding portion is expanded. The air belt apparatus includes webbing corresponding to the chest of an occupant, an expanding portion provided in the webbing, and folded back so as to be developed up to a position corresponding to a head of the occupant at a time of expansion, and an extending portion covering the expanding portion and extended upward from an upper end of the expanding portion, and further includes an elastic cover being expandable along the expansion of the expanding portion, and a non-extendable sheet member that enables the extending portion to pass through the shoulder anchor by reinforcing the extending portion of the elastic cover.

12 Claims, 6 Drawing Sheets

FIG. 6

AIR BELT APPARATUS

BACKGROUND

The present invention relates to an air belt apparatus for use in a motor vehicle having an expanding portion provided in a seat belt webbing for occupant restraint.

An air belt apparatus for use in a motor vehicle is disclosed in Unexamined Japanese Patent Application Publication No. 2002-187514. In the air belt apparatus, a bag (expanding portion) of the air belt is housed in a mesh webbing (elastic cover) upon being folded back along a folding-back line, orthogonal to a longitudinal direction. Thereby, the bag of the air belt is prevented from passing through a belt guide (shoulder anchor). In addition, a length of the expanding portion (developing length) of the webbing (bag) is configured to be further elongated.

However, in the above-described example, although a developing length of the webbing can be elongated, the comfort of the webbing during normal operation can be improved. The comfort can be improved because a cover is constructed to retain a bag-shaped portion of the webbing in a belt-shaped manner by covering the bag-shaped portion of the webbing during normal operation. When the bag is expanded, the cover is configured to pass through a shoulder anchor.

In light of the aforementioned problems, an object of the present invention to improve the comfort of the webbing during normal operation by thinning a thickness of the webbing that passes through the shoulder anchor, and extending the developing length of an expanded portion of the bag upward, when the bag is expanded.

SUMMARY

According to one embodiment of the invention, an air belt apparatus includes webbing for an occupant restraint corresponding to a chest portion of an occupant; an expanding portion provided in the webbing for occupant restraint and folded back so as to be developed up to a position corresponding to a head portion of the occupant when expanded; an elastic cover covering the expanding portion and including an extending portion extended upward from an upper end of the expanding portion, and being able to be expanded along with an expansion of the expanding portion, and a non-extendable sheet member reinforcing the extending portion of the elastic cover, and thereby enabling the extending portion to be passed through a shoulder anchor.

According to another embodiment of the invention, a portion of the expanding portion being folded back is developed up to a position corresponding to the head portion of the occupant when the expanding portion is expanded, and the elastic cover is also expanded along the expansion of the expanding portion. That is, a developing length of the expanding portion can be extended upward by means of developing the expanding portion up to a position situated nearer an upside in relation to an upper end of the expanding portion in the folded back condition.

According to still another embodiment of the invention, since the extending portion in the elastic cover that does not cover the expanding portion is reinforced by means of the non-extendable sheet member, a non-extendibility similar to that of standard webbing can be secured even when the elastic cover is not reinforced by covering the same with a non-extendable cover, and a shape of the extended portion can be retained in a thin belt-like condition. Accordingly, an extending portion of the elastic cover can be smoothly passed through the shoulder anchor, and the comfort of the air belt during operation can be improved.

According to yet another embodiment of the invention, the sheet member is inserted into the elastic cover, and is combined with the elastic cover in a manner capable of being separated therefrom when the expanding portion is expanded.

According to another embodiment of the invention, since the sheet member is combined with the elastic cover in a manner capable of being separated therefrom when the expanding portion is expanded, a development of the expanding portion can be prevented from being disturbed, and the expanding portion can be developed up to a predetermined area, namely a position corresponding to the head portion of the occupant. Further, since the sheet member is inserted into the elastic cover, the sheet member is not exposed during normal operation, and therefore has a good appearance.

According to still another embodiment of the invention, the sheet member is combined with an inner peripheral surface of the elastic cover.

According to yet another embodiment of the invention, since the sheet member is combined with the inner peripheral surface of the elastic cover, a portion in the extending portion of the elastic cover to which the sheet member is combined can be formed to be non-extendable. In the case that the sheet member is combined with the inner peripheral surface of the extending portion across an entire length thereof, the entire extending portion can be formed to be non-extendable. Further, the extending portion can be passed through the shoulder anchor in a similar manner as that of the standard webbing.

According to another embodiment of the invention, the sheet member is combined together with the elastic cover and a non-extendable cover that covers the elastic cover except for the extending portion. The elastic cover and the sheet member are capable of being separated from the cover when the expanding portion is expanded.

According to yet another embodiment of the invention, the elastic cover except for the extending portion is covered with a non-extendible cover A portion covered with the cover, namely a portion including the expanding portion has an increased thickness. Accordingly, the extending portion can pass through the shoulder anchor because of less thickness, while the expanding portion covered with the cover does not pass through the shoulder anchor.

According to still another embodiment of the invention, since the sheet member is combined together with the cover and the elastic cover, and the elastic cover and the sheet member are able to be separated from the cover when the expanding portion is expanded, an area from the extending portion of the elastic cover into which the sheet member is inserted to the expanding portion covered with the cover is non-extendible similar to that of standard webbing during normal operation. The elastic cover, the sheet member and the cover are separated from each other when the expanding portion expands, and thereby the expanding portion can be developed up to the position corresponding to the head portion of the occupant without being disturbed by the sheet member and the cover.

It is to be understood that both the foregoing general description and the following detailed description are exemplary and explanatory only, and are not restrictive of the invention as claimed.

DETAILED DESCRIPTION

Embodiments of the present invention will be described below with reference to the accompanying drawings. It should be understood that the following description is intended to describe exemplary embodiments of the invention, and not to limit the invention.

Figure 1:
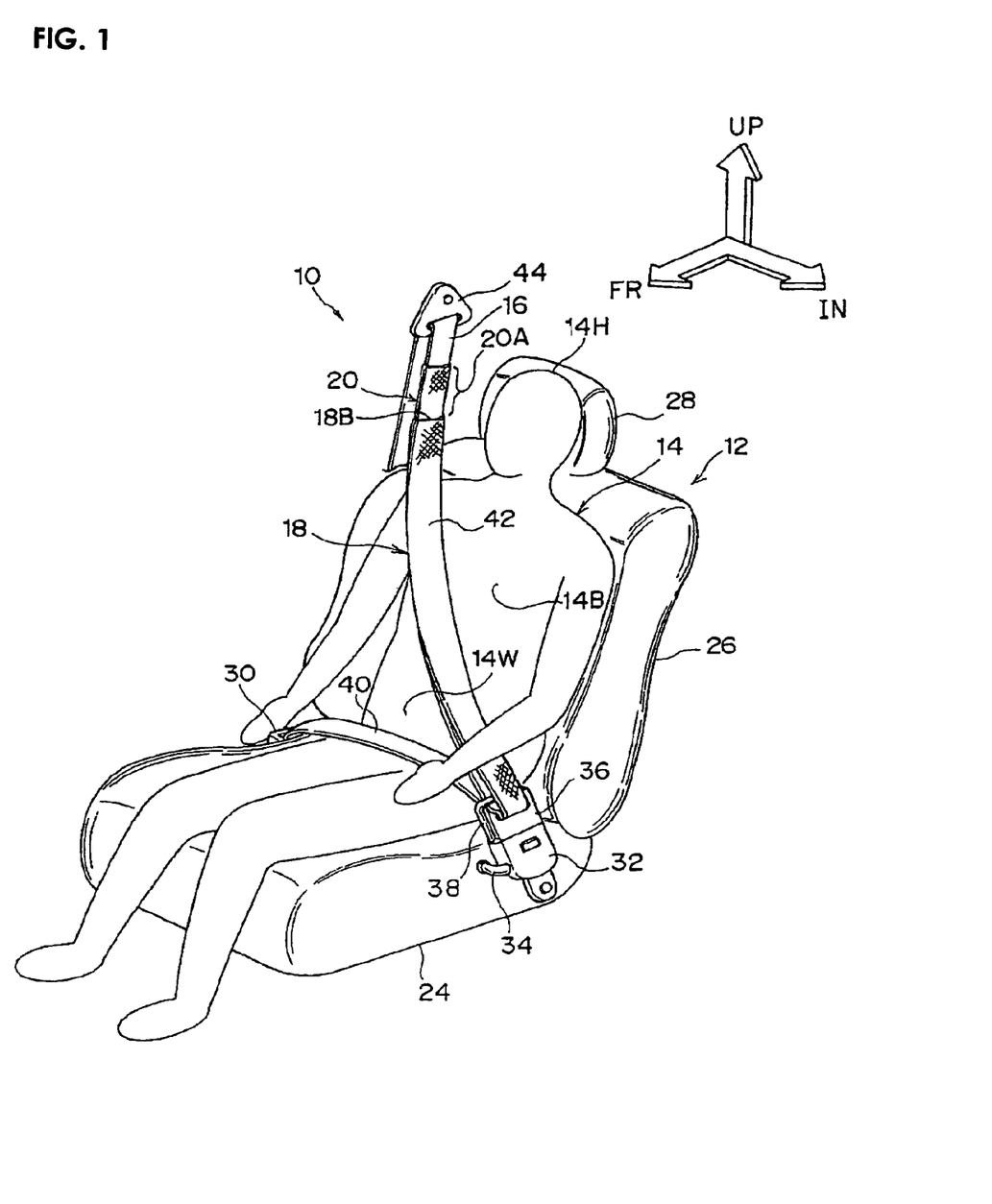
FIG. 1 is a perspective view showing a condition in which an occupant is seated in a motor vehicle seat, and wears an air belt apparatus for use in the motor vehicle.

In FIG. 1, according to one embodiment of the invention, an air belt apparatus 10 for use in a motor vehicle is a kind of seat belt for restraining an occupant 14 seated in a motor vehicle seat 12. The air belt apparatus 10 for use in the motor vehicle is provided with webbing 16 for occupant restraint, an expanding portion 18, an elastic cover 20, and a sheet member 22 (refer to FIG. 2).

The motor vehicle seat 12 is provided with a seat cushion 24 having a seat frame (not shown), where the occupant 14 is seated, a seatback 26 for supporting a back of the occupant 14, and a headrest 28 provided at an upper part of the seatback 26. The motor vehicle seat 12 is slidably provided in a front and back direction of the motor vehicle on a seat rail on a floor panel (not shown).

A lap outer retractor 30 is mounted on a side portion of an outer side of a vehicle interior of the seat cushion 24, and a buckle device 32 is mounted on a side portion of a center side of the vehicle interior of the seat cushion 24 in a manner, for example, so as to be able to swing in a front and back direction of the motor vehicle, respectively. In the buckle device 32 or outside the buckle device 32, for example, an inflator, which is a gas-supplying source for the expanding portion 18, is disposed (not shown). According to one embodiment of the invention, the inflator is provided outside of the buckle device 32. At a lower portion of the seat cushion 24, the inflator and the buckle apparatus 32 are connected to each other by a gas-supplying tube 34.

According to one embodiment of the invention, the webbing 16 for occupant restraint is a belt-shaped member corresponding to a chest portion 14B of the occupant 14. The webbing 16 for occupant restraint is capable of being retracted by a retractor (not shown) that is disposed in a center pillar. The webbing 16 for occupant restraint is thereby capable of being pulled out from the retractor fitting a physical size of the occupant 14 when the occupant wears the webbing 16 for occupant restraint.

According to one embodiment of the invention, a tongue plate 36 configured to be able to fit into the buckle 32 is provided at, for example, a tip end of the webbing 16 for occupant restraint. An inserting portion 38 serving as a gas introducing inlet to the expanding portion 18 is provided in the tongue plate 36. When the tongue plate 36 is fit into the buckle device 32, the inserting portion 38 is also inserted into a predetermined insertion hole (not shown) of the buckle device 32, and the gas from the inflator is configured so that the gas is capable of being supplied into the expanding portion 18 from a side of the buckle device 32.

A lap belt 40 corresponding to a waist portion 14W of the occupant 14 is configured to be pulled out from a lap outer retractor 30 provided at the side portion of the outer side of the vehicle interior of the motor vehicle seat 12. A tip end of the lap belt 40 is connected to the tongue plate 36. Incidentally, the lap belt 40 and the webbing 16 for occupant restraint may be constructed as single webbing, and the tongue plate 36 may be enabled to move to fit to a physical size of the occupant 14.

Figure 2:
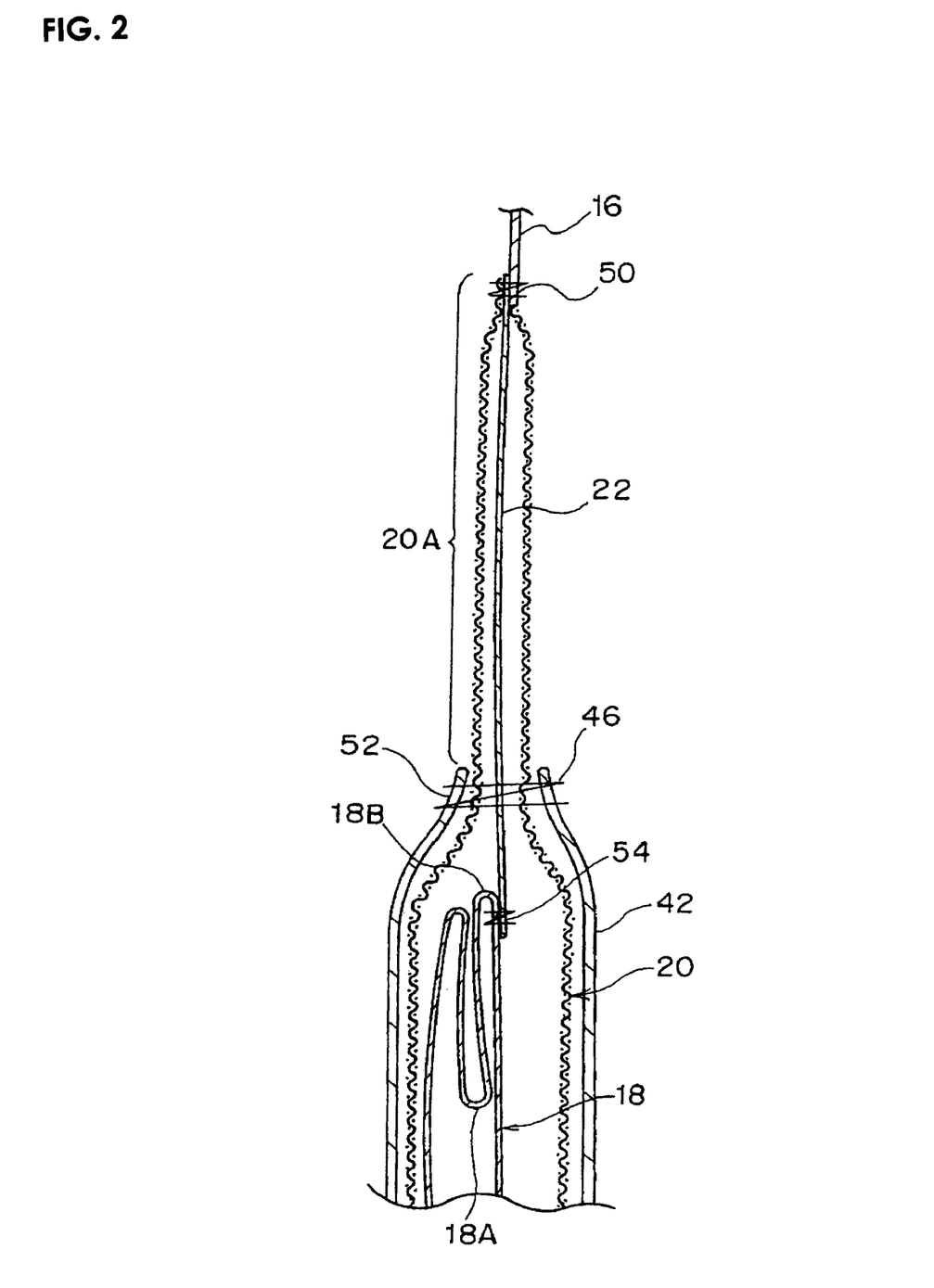
FIG. 2 is a cross-section view of an air belt apparatus according to one embodiment of the invention, showing a folded-back condition of an expanding portion in the vicinity of an upper end of a cover, and a combining condition of the cover, elastic cover, sheet member, and webbing for occupant restraint.

According to one embodiment of the invention, the expanding portion 18 is formed of a bag-shaped body that is provided in the webbing 16 for occupant restraint and is folded back so as to be developed up to a position corresponding to an area from the chest portion 14B of the occupant 14 to a head portion 14H at a time of expansion. In concrete terms, the expanding portion 18 is folded back into a belt-like shape similar to that of the webbing 16 for occupant restraint. In particular, as shown in FIG. 2, in the expanding portion 18, an upper end portion 18A that develops in a manner so as to be projected to a side of a head portion 14H of the occupant 14 (in FIG. 1), at the time of expansion is folded back downward in a cross-section in a thickness direction, namely toward a side of the tongue plate 36 in FIG. 1. Thereby, an entire length of the expanding portion 18 is formed to be relatively short during ordinary use or normal operation. At the time of expansion, the upper end portion 18A is projected and developed, and a developing length is configured to be elongated. Further, the expanding portion 18 is covered with the elastic cover 20. According to one embodiment of the invention, the expanding portion 18, and a cover 42 that covers the elastic cover 20 are stitched using a stitching for control, namely a so-called tear seam (not shown), which is ruptured in a case that internal pressure at a predetermined strength or more is exerted, for example, to both sides in a lateral direction.

Incidentally, as shown in FIG. 2, in the present embodiment, the expanding portion 18 is connected to an end portion of the webbing 16 for occupant restraint at a combining portion 50 via the sheet member 22. However, according to one embodiment of the invention, the webbing 16 for occupant restraint may be provided in an area from the lap outer retractor 30 to the tongue plate 36, and the expanding portion 18 may be provided to overlap with the webbing 16 for occupant restraint.

As shown in FIG. 2, the elastic cover 20 covers the expanding portion 18, and includes an extending portion 20A being extended upward from an upper end 18B of the expanding portion 18. According to one embodiment of the invention, the elastic cover 20 is, for example, bag-shaped mesh webbing capable of being expanded along the expansion of the expanding portion 18. The extending portion 20A is projected to an upside from the cover 42, namely in a direction to retract the webbing 16 for occupant restraint. Further, the elastic cover 20 is combined with the webbing 16 for occupant restraint by, for example, being stitched on the webbing 16 for occupant restraint at the combining portion 50 at an upper end of the extending portion 20A together with an end portion of the sheet member 22. The extending portion 20A is not covered by means of the cover 42 and is therefore formed to be thinner than the portion covered with the cover 42.

Figure 3:
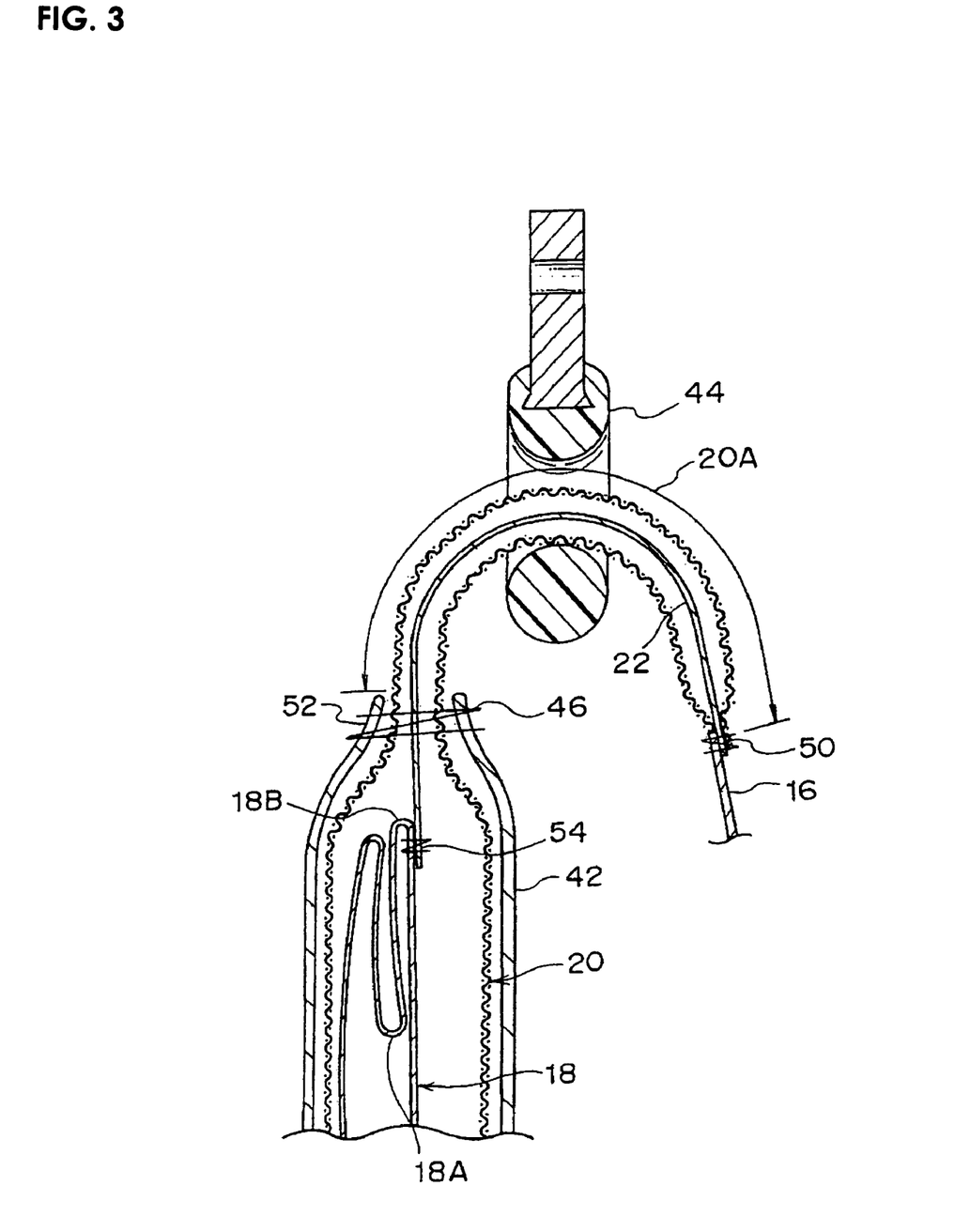
FIG. 3 is a cross-section view of an air belt apparatus according to one embodiment of the invention, showing a condition in which an extending portion of the elastic cover reinforced by the sheet member passes through a shoulder anchor.

As shown in FIGS. 2 and 3, according to one embodiment of the invention, the sheet member 22 is a non-extendable belt-shaped member made of, for example, polyester that enables the extending portion 20A of the elastic cover 20 to be reinforced, and enables the extending portion 20A to be thereby allowed to pass through a shoulder anchor 44. The sheet member 22 is provided with tension strength equal to that of, for example, the webbing 16 for occupant restraint. Further, the sheet member 22 is inserted into an inside of the elastic cover 20, and is combined with the elastic cover 20 in a manner so as to be separatable therefrom at the time of expansion of the expanding portion 18. In concrete terms, a lower end of the sheet member 22 is combined with the upper end 18B of the expanding portion 18 being in a folded back condition, at a combining portion 54 in the vicinity of the upper end 18B by means of, for example, joining work with an adhesive, or stitching work. In addition, the sheet member 22 is stitched and combined with the cover 42 together with the elastic cover 20 at a combining portion 52 at an upper end of the cover 42 close to the combining portion 54 by means of a tear seam 46. Further, when the expanding portion 18 is expanded, the tear seam 46 is ruptured at the combining portion 52, and the cover 42, the elastic cover 20, and the sheet member 22 are separated from each other.

An upper end of the sheet member 22 is combined with the webbing 16 for occupant restraint at a combining portion 50 at an upper end of the extending portion 20A of the elastic cover 20 together with the elastic cover 20 by means of, for example, stitching work. The combining condition, in which the webbing 16 for occupant restraint, the sheet member 22, and the elastic cover 20 are combined together, at the combining portion 50 is retained even at the time of expansion of the expanding portion 18.

Incidentally, the sheet member 22 may be configured to be combined with, for example, an inner peripheral surface of the extending portion 20A of the elastic cover 20 using a tear seam (not shown) or an adhesive agent so that the sheet member 22 is separated from the inner peripheral surface of the extending portion 20A when the expanding portion 18 is expanded. This is because, in the extending portion 20A of the elastic cover 20, a portion with which the sheet member 22 is combined can be provided with non-extendibility, and in addition, in a case that the sheet member 22 is combined with the inner peripheral surface of the extending portion 20A across an entire length thereof, the extending portion 20A can entirely be provided with non-extendibility, and the extending portion 20A can be passed through the shoulder anchor 44 in a manner similar to that of standard webbing.

As shown in FIG. 3, according to one embodiment of the invention, in the air belt apparatus 10 for use in a motor vehicle, the elastic cover 20, except for the extending portion 20A is covered with a non-extendable cover 42. Therefore, the thickness of the portion covered with the cover 42, namely the thickness of the portion including the expanding portion 18 is increased. Accordingly, the expanding portion 18 covered with the cover 42 does not pass through the shoulder anchor 44. Alternatively, the extending portion 20A in the elastic cover 20, which does not cover the expanding portion 18, is reinforced by the non-extendable sheet member 22, and therefore non-extendibility similar to that of the standard webbing is achieved. Accordingly, there is no need to reinforce the extending portion 20A by covering the extended portion 20A with the non-extendible cover 42. Therefore, the extending portion 20A is retained in a thin belt-like shape, and the thickness thereof is formed to be less than that of a portion covered with the cover 42. Consequently, the extending portion 20A can smoothly pass through the shoulder anchor 44 and the extending portion 20A becomes capable of being housed in a retractor.

Since the sheet member 22 is inserted into the elastic cover 20, the sheet member 22 is not exposed during ordinary use, and therefore provides the air belt apparatus with a good appearance. Further, as compared to a case where the elastic cover 20 is covered with the cover 42 up to the extending portion 20A, the amount of force applied on the webbing 16 for occupant restraint to be pulled out from and retracted by the retractor is increased. Therefore, the webbing 16 for occupant restraint is comfortable during normal operation.

Figure 4:
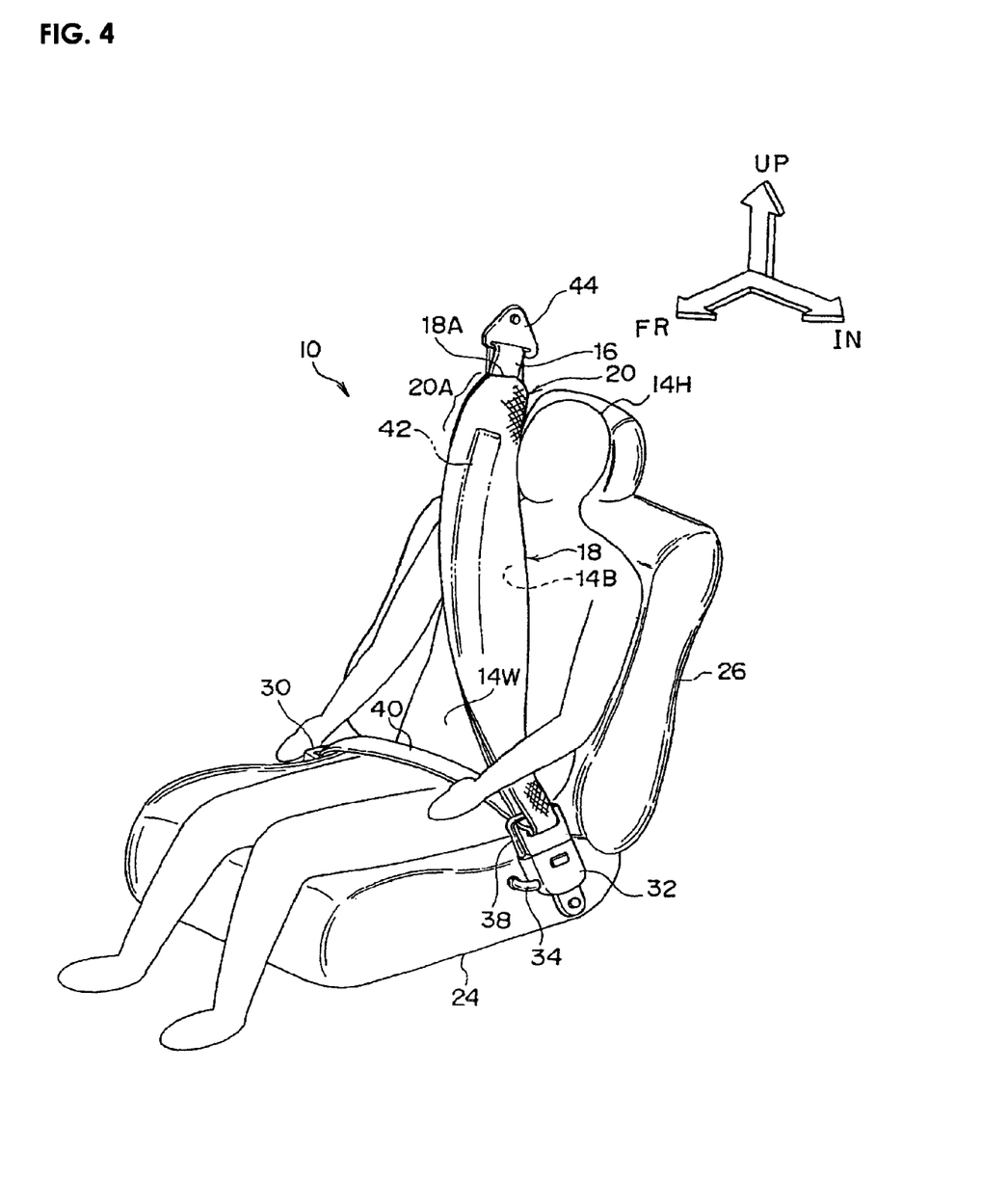
FIG. 4 is a perspective view of an air belt apparatus according to one embodiment of the invention, showing a condition in which the air belt apparatus for use in the motor vehicle is operated. The expanding portion is expanded up to a position corresponding to a position from a chest portion of the occupant to a head portion of the occupant.

On the other hand, when the sensor (not shown) detects a collision of a motor vehicle, according to one embodiment of the invention, ignition electric current flows into the inflator and an ignition device of the inflator is activated. As a result, a large amount of gas is blown out from the inflator. The large amount of gas is supplied into the expanding portion 18 from the buckle device 32 through the insertion portion 38 of the tongue plate 36. The tear seam that retains the expanding portion 18 to have the belt-like shape is ruptured by means of pressure of the gas. The expanding portion 18 is expanded to a position corresponding to that from the chest portion 14B of the occupant 14 to the head portion 14H of the same, as shown in FIG. 4.

Figure 5:
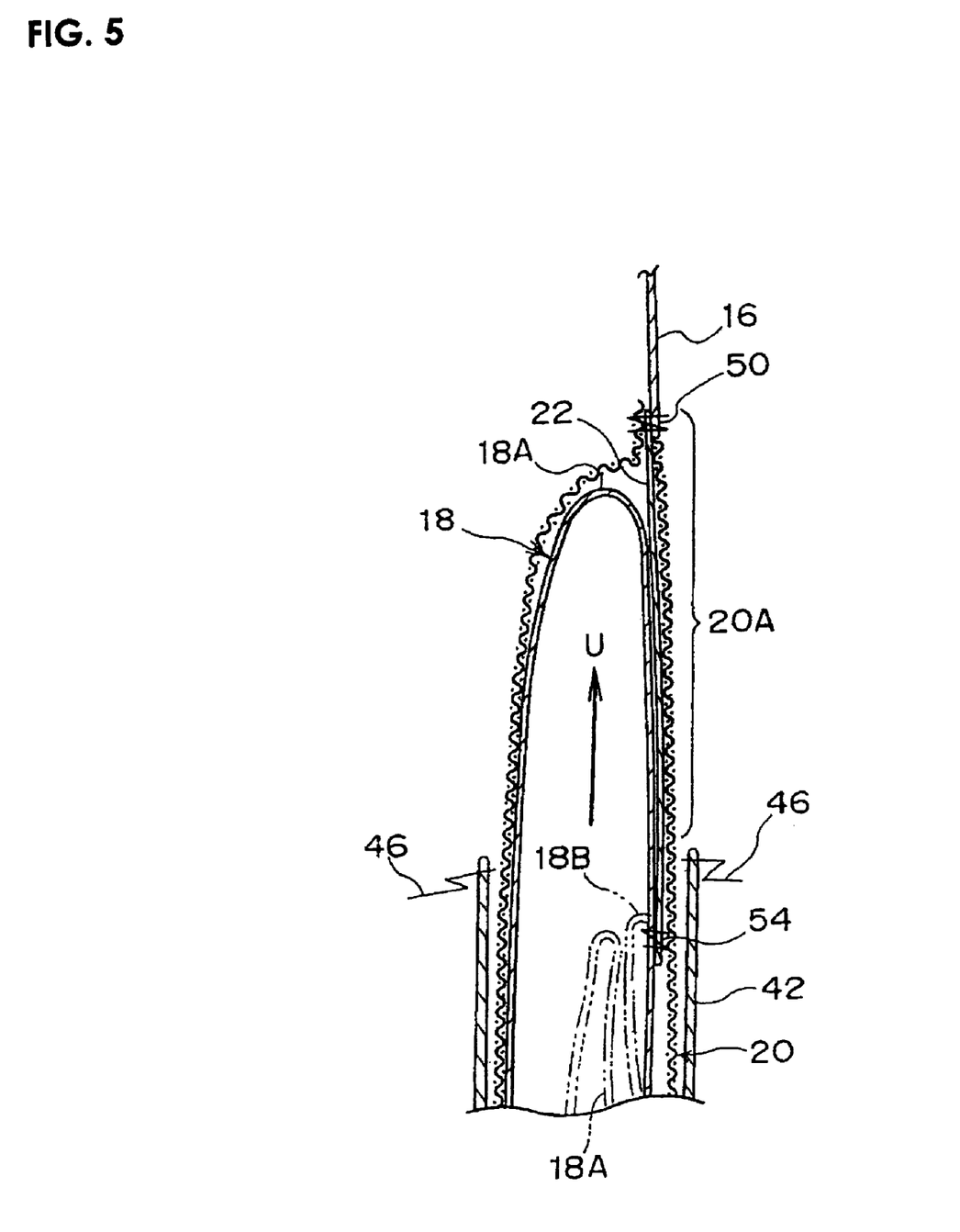
FIG. 5 is a cross-section view of an air belt apparatus according to one embodiment of the invention, showing a condition in which a tear seam is ruptured by gas pressure, and the cover, the elastic cover, and the sheet member are thereby separated. An upper end portion of the expanding portion is developed toward the extending portion of the elastic cover in the upper end of the cover.

At this time, as shown in FIG. 5, at the combining portion 52 at the upper end of the cover 42, the tear seam 46 that is stitching the upper end of the cover 42 together with the elastic cover 20 and the sheet member 22 is ruptured by the pressure of the gas. Thereby, the cover 42, the elastic cover 20, and the sheet member 22 are separated from each other, and the upper end portion 18A of the expanding portion 18 being folded back is developed in a manner so as to be projected in a direction indicated by an arrow U toward the extending portion 20A of the elastic cover 20. Since the elastic cover 20, the sheet member 22, and the cover 42 are separated from each other at the combining portion 52, there is no possibility that the expansion of the expanding portion 18 is disturbed by the sheet member 22 or the cover 42. The expanding portion 18 is rapidly developed up to a position corresponding to that of the head portion 14H of the occupant 14. Since the elastic cover 20 is formed from a mesh webbing having extendibility, the elastic cover 20 can be expanded along the expansion of the expanding portion 18, and even in a case that a developing length of the upper end portion 18A is larger than a length of the extending portion 20A, developing of the upper end portion 18A is not disturbed.

According to another embodiment of the invention, a combining condition of each of the members at the combining portion 50 is also retained at the time of expansion of the expanding portion 18. Therefore, tension force required for a seat belt can be retained, and the inertial force of the occupant 14 can be supported.

As described above, according to one embodiment of the invention, the expanding portion 18 of the air belt apparatus 10 is developed up to a position situated nearer the upside in relation to the upper end 18B in the folded-condition of the expanding portion 18. An expanding area can thereby be enlarged by extending a developing length of the expanding portion 18 upward. Thereby, when inertial force to an outside of the vehicle interior is exerted to the head portion 14H by a side collision or the like, the inertial force can be absorbed by the expanding portion 18. According to another embodiment of the invention, inertial force of the chest portion 14B of the occupant 14 generated at a time of forward collision is also absorbed by the expanding portion 18. Further, in the air belt apparatus 10 for use in the motor vehicle, not only the developing length of the expanding portion 18 at the time of expansion is extended upward, but also the operational feeling at the time of operating the webbing can be improved by thinning the thickness of the webbing that passes through the shoulder anchor 44.

Incidentally, in the aforementioned embodiment, a structure in which the expanding portion 18 is attached to the webbing 16 for occupant restraint is explained. However, according to another embodiment of the invention, a structure in which a middle portion or a part of the webbing 16 for occupant restraint is constructed by the expanding portion 18, and in which the expanding portion 18 has a role to serve as the webbing 16 for occupant restraint may be applied.

Figure 6:
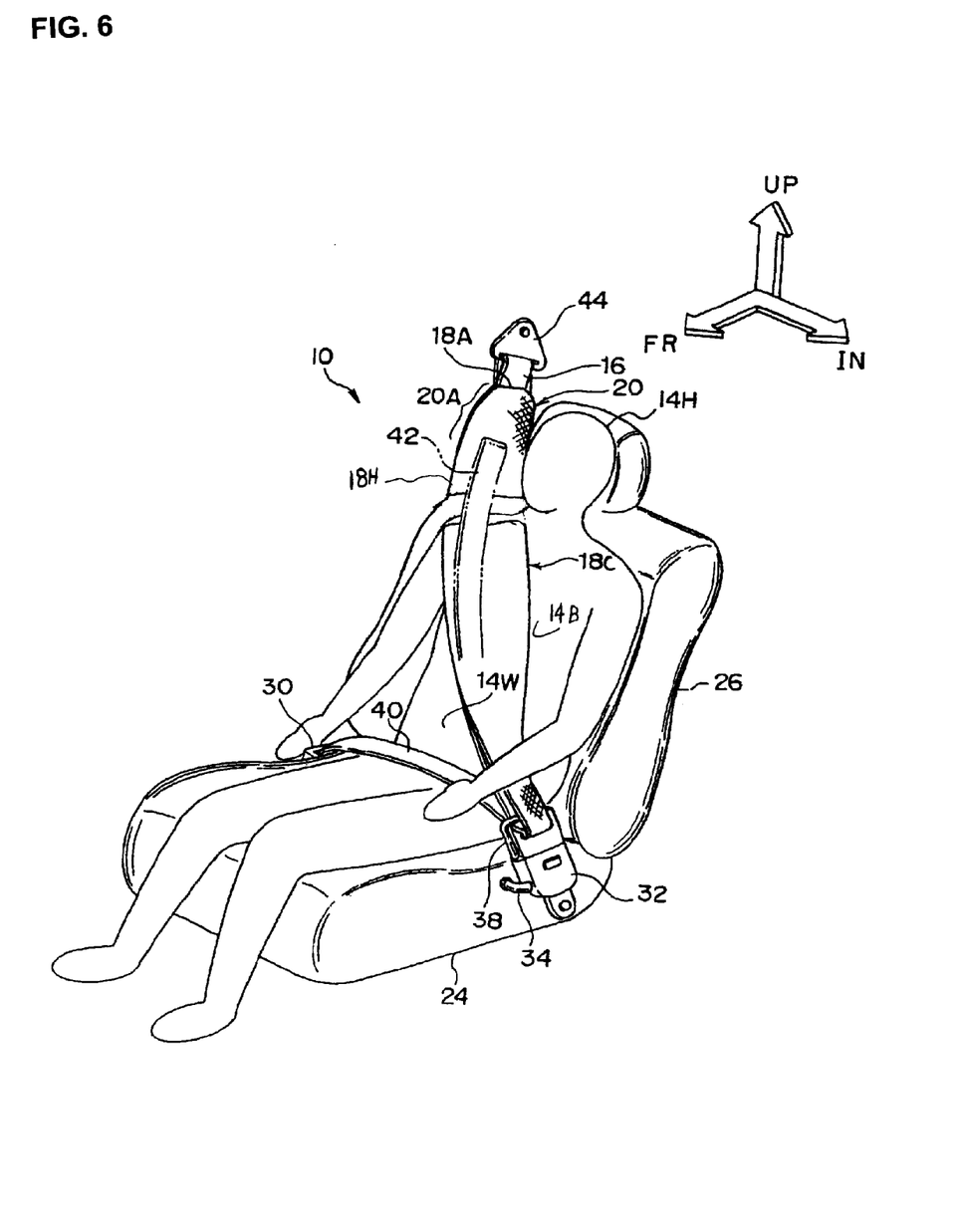
FIG. 6 is a perspective view of an air belt apparatus according to another embodiment of the invention, showing a condition is which the air belt apparatus for use in the motor vehicle is operated. The expanding head and chest portions are shown expanded to their respective positions.

Further, in the aforementioned embodiment, a previously folded-back upper end portion 18A is developed to a position corresponding to the head portion 14H of the occupant 14. However, according to another embodiment of the invention, as schmatically shown in FIG 6, the structure may be formed by separately providing a chest portion expanding portion 18C and a head portion expanding portion 18H, and, for example, the same may be respectively expanded by separate inflators. In this case, the construction may be formed such that expansion timing for the chest portion 18C and for the head portion 18H are deviated, or that only one portion is expanded corresponding to a colliding condition, such as the forward collision or the side collision.

In addition, the expanding portion 18 may be disposed such that an attaching position thereof is adjustable in a longitudinal direction of the webbing 16 for occupant restraint.

Furthermore, in the air belt apparatus 10 for use in the motor vehicle, a lower end of the sheet member 22 is not always necessary to be connected to the expanding portion 18. It is sufficient that the lower end of the sheet member 22 is fixed to the elastic cover 20 by, for example, the joining work with the adhesive, or the stitching work, so that the sheet member 22 does not move in the elastic cover 20 during normal belt operation.

As explained above, the air belt apparatus for use in a motor vehicle has several advantages. For example, the comfort of the air belt apparatus in relation to the passenger during normal operation of the air belt is improved by thinning a thickness of the webbing that passes through a shoulder anchor, while allowing a developing length of the expanding portion to be upwardly extended at a time of expansion.

In addition, the expanding portion can be expanded to a predetermined area, such as a position corresponding to a head portion of an occupant. Further, another advantage of the invention is that a portion in an extending portion of an elastic cover with which a sheet member is combined can be formed to be non-extendable.

Still another advantage of the present invention is that an area from the extending portion of the elastic cover into which the sheet member is inserted, to the expanding portion covered with a cover is non-extendible similar to that of the standard webbing during normal operation, and in which the elastic cover, sheet member and the cover are separated from each other at the time of expansion of the expanding portion, and thereby the expanding portion can be developed up to a position corresponding to the head portion of the occupant without being disturbed by the sheet member or the cover.

Priority Application, Unexamined Japanese Patent Application No. 2005-321426, filed Nov. 4, 2005 including the specification, drawings, claims and abstract, is incorporated herein by reference in its entirety.

The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. The embodiment was chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents.

What is claimed is:

1. An air belt apparatus for use in a motor vehicle, comprising:
    webbing for occupant restraint corresponding to a chest portion of an occupant;
    an expanding portion provided in the webbing for occupant restraint and folded back so as to be developed up to a position corresponding to a head portion of the occupant when expanded;
    an elastic cover covering the expanding portion, and including an extending portion extended upward from an upper end of the expanding portion, configured to be expanded along with an expansion of the expanding portion, and
    a non-extendable sheet member reinforcing the extending portion of the elastic cover, and thereby enabling the extending portion to be passed through a shoulder anchor.

2. The air belt apparatus for use in a motor vehicle according to claim 1, wherein the non-extendible sheet member is inserted into the elastic cover, and is combined with the elastic cover in a manner capable of being separated therefrom when the expanding portion is expanded.

3. The air belt apparatus for use in a motor vehicle according to claim 1, wherein the sheet member is combined with an inner peripheral surface of the elastic cover.

4. The air belt apparatus for use in a motor vehicle according to claim 1, wherein the non-extendable sheet member is combined together with the elastic cover and a cover covering the elastic cover other than the extending portion, and wherein the elastic cover and the sheet member are able to be separated from the cover when the expanding portion is expanded.

5. The air belt apparatus for use in a motor vehicle according to claim 1, further comprising a tongue plate positioned at the end of the webbing, configured to fit in a buckle.

6. The air belt apparatus for use in a motor vehicle according to claim 5, wherein gas is capable of being supplied into the expanding portion from a side of the buckle.

7. The air belt apparatus for use in a motor vehicle according to claim 5, wherein a lap belt is connected to the tongue plate.

8. The air belt apparatus for use in a motor vehicle according to claim 1, wherein the elastic cover is a bag-shaped mesh webbing.

9. The air belt apparatus for use in a motor vehicle according to claim 1, wherein the elastic cover is stitched to the webbing and the non-extendable sheet member.

10. The air belt apparatus for use in a motor vehicle according to claim 1, wherein the non-extendable sheet member is made of polyester.

11. The air belt apparatus for use in a motor vehicle according to claim 1, wherein the non-extendable sheet member is attached to the upper end of the expanding portion.

12. The air belt apparatus for use in a motor vehicle according to claim 1, wherein the expanding portion further comprises a separate chest expanding portion and a separate head expanding portion.

\* \* \* \* \*